United States Patent [19]

Griesser et al.

[11] Patent Number: 4,733,577
[45] Date of Patent: Mar. 29, 1988

[54] ELECTROMAGNETICALLY ACTUATED LOCKING CLUTCH FOR DIFFERENTIAL GEARS OF MOTOR VEHICLES

[75] Inventors: Walter Griesser, Friedrichshafen; Friedrich Schreiner, Kehlen-Reute, both of Fed. Rep. of Germany

[73] Assignee: Zahnradfabrik Friedrichshafen AG, Friedrichshafen, Fed. Rep. of Germany

[21] Appl. No.: 882,909

[22] PCT Filed: Oct. 25, 1985

[86] PCT No.: PCT/EP85/00563

§ 371 Date: Jun. 25, 1986

§ 102(e) Date: Jun. 25, 1986

[87] PCT Pub. No.: WO86/02981

PCT Pub. Date: May 22, 1986

[30] Foreign Application Priority Data

Nov. 6, 1984 [EP] European Pat. Off. ......... PCT/EP84/00352

[51] Int. Cl.⁴ .............................................. F16H 1/44.5
[52] U.S. Cl. ................................. 74/710.5; 192/48.2
[58] Field of Search ............... 74/710.5, 711; 192/84 AA, 84 AB, 84 C, 48.2, 48.5, 48.9

[56] References Cited

U.S. PATENT DOCUMENTS

| | | | |
|---|---|---|---|
| 1,328,966 | 1/1920 | Pollard | 192/84 AB |
| 2,875,875 | 3/1959 | Prahauser et al. | 192/84 C |
| 2,936,054 | 5/1960 | Simon et al. | 192/84 |
| 2,966,975 | 1/1961 | Wiedmann et al. | 192/84 |
| 3,212,359 | 10/1965 | Salzmann | 74/711 |
| 3,300,008 | 1/1967 | Mendenhall | 192/84 C |
| 3,484,816 | 12/1969 | Davidson | 192/84 C |

FOREIGN PATENT DOCUMENTS

| | | | |
|---|---|---|---|
| 655318 | 1/1963 | Canada | 192/84 C |
| 697980 | 11/1964 | Canada | 192/84 C |
| 709866 | 7/1941 | Fed. Rep. of Germany | 192/84 AB |
| 101317 | 8/1957 | Fed. Rep. of Germany | . |
| 2920107 | 1/1982 | Fed. Rep. of Germany | . |
| 1172207 | 2/1959 | France | . |
| 1298522 | 12/1962 | France | 192/84 C |
| 45444 | 4/1979 | Japan | 192/84 C |
| 912576 | 12/1962 | United Kingdom | 192/84 C |
| 2129886 | 5/1984 | United Kingdom | . |

OTHER PUBLICATIONS

Herman Roloff/Wilhelm Matek, Authors of "Maschinenelemente", published by Friedr. Vieweg & Sohn, Braunschweig, 1972, p. 295, (Not Translated).

*Primary Examiner*—Leslie Braun
*Assistant Examiner*—Dwight G. Diehl
*Attorney, Agent, or Firm*—Hayes, Davis & Soloway

[57] ABSTRACT

An electromagnetically actuated locking clutch for differential gears of motor vehicles having two concentrically disposed toroidal coils (8, 21) firm on a housing, one for a non-positive disk clutch (14) and the other for a positive claw clutch (26) concentrically disposed in respect thereto. Both clutches (14, 26) connect a hub (2) and a socket (3). The hub (2) and the socket (3) are each non-rotatably connected with a connecting member of the differential gear. The disk clutch (14) is closed by an automatic device when a limit value for a relative speed is exceeded. The claw clutch (26) is optionally closed and automatically opened when a limit value for an actuation period is exceeded.

8 Claims, 1 Drawing Figure

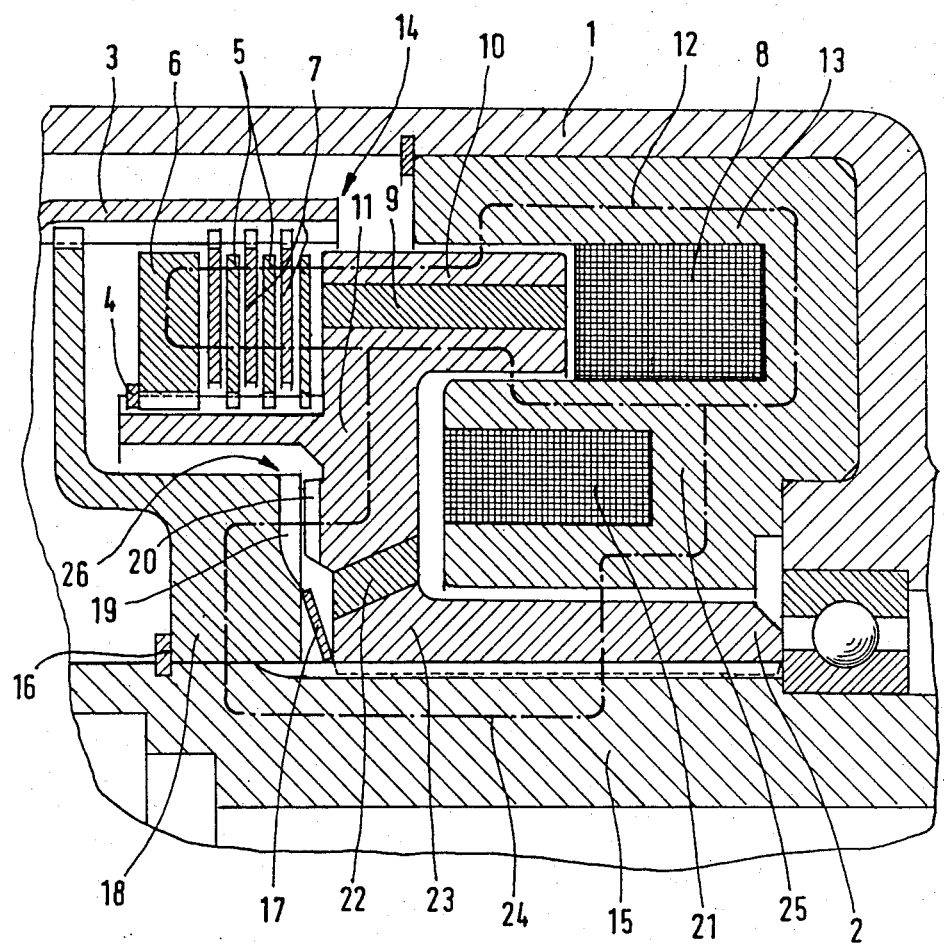

ELECTROMAGNETICALLY ACTUATED LOCKING CLUTCH FOR DIFFERENTIAL GEARS OF MOTOR VEHICLES

The invention relates to a slip limiting device for a differential gear of a motor vehicle.

A locking clutch of this kind is known already (German Pat. No. 2,920,107). A locking clutch according to German Pat. No. 2,920,107 uses for transmitting the switching force from the annular bodies that form the armature of the electromagnet to the two friction clutches a series of hydraulic intermediate members in the form of clamping bolts and actuation pistons, which are passed into guide bores and additional cylindrical bores in the differential basket and sealed, being interconnected by hydraulic conduits in the differential basket. The sealing of the clamping bolts and actuation pistons and the thermal expansion of the oil in the hydraulic conduits give rise to serious problems.

The present invention is based on the problem of designing an electromagnetically actuated locking clutch which is substantially simpler and operates more reliably.

This problem is solved by having the actuation members of the friction clutch and of the armature of the electromagnet constitute a single structural part. There are eliminated for the transmission of the switching force special intermediate elements which are expensive and susceptible to failure. The invention is applicable to all differential gears of motor vehicles, not only to axle differentials between wheels of an axle but also to intermediate axle differentials between axles of a motor vehicle.

A special armature can be elimiated, since the end disk additionally assumes its function.

A special spring can be eliminated, since disks additionally assume its function.

With simple, ordinary means the relative speed is limited, a full rotation when driving and a blocking when braking are reduced and the safety in traveling can be increased.

Control and regulation of the locking clutch can be accomplished by the use of a microprocessor.

Added to the non-positive friction clutch can be a positive claw clutch that operates in parallel. Thereby it is always possible to select the better suited of the two clutches in order to overcome the difficulties of a particular traveling situation. When accelerating on a mountain, deficient frictional contact between wheel and ground in one or more of the driven wheels can occur. The claw clutch is preferred in that situation, since, if needed, it can makes available the whole driving force on the single wheel that still grips. When traveling at high speeds on roadways that are uneven or with many curves, frictional contact between a wheel and the ground can repeatedly become briefly deficient due to low or absolutely missing wheel pressure (wheel springing, lifting of a curve inner wheel) and then becomes very good again. The preferred clutch in this situation is a friction clutch with a limitation of the torques and of the relative speed with the possibility of compensating the speed, when driving in a curve, with good frictional contact between a wheel and the ground.

Special intermediate members can be eliminated, since their functions are additionally assumed by the structural part present, the actuation member and the disk carrier.

Using simple, ordinary means it is possible to avoid an overloading of driving members, especially the drive shafts, since an alarm signal either reminds the driver that the claw clutch is switched on or a device causes the automatic opening of the claw clutch.

Overloading due to brisk cut-in current rush can be prevented by using simple ordinary means.

In the drawing is illustrated as an embodiment according to the invention a locking clutch wherein two connecting members of a differential gear of a motor vehicle are connected by a non-positive friction clutch and a disk clutch and by a positive claw clutch operating parallel therewith.

FIG. 1 is a segment of a longitudinal section.

In a housing 1 are supported two central wheels, not shown, as two connecting members of a differential gear, not shown. A hub 2, as a first disk carrier 2, is firmly connected with the first connecting member and a socket 3, as second disk carrier 3, is firmly connected with the second connecting member. The hub 2 carries, non-rotatably and axially movably, limited by a guard ring 4, inner disks 5 and an end disk 6. The socket 3 carries, non-rotatably and axially movably, limited by the end disk 6, outer disks 7. The outer disks 7 are shaped as corrugated disk springs 7.

A toroidal coil 8 is fastened in the housing 1. An insulating ring 9 separates a magnetically conducting radially outer zone 10 from a magnetically conducting radially central zone 11 of the hub 2. An electric current in the toroidal coil 8 produces a magnetic flux 12 in a magnetically conducting zone 13 around the toroidal coil 8 through both zones 10 and 11 of the hub 2, through the magnetically conducting disks 5,7 and the end disk 6. The end disk 6 forms therewith at the same time an armature 6 of an electromagnet and an actuation member 6 of a friction clutch 14 of a disk clutch 14.

The hub 2 is fastened on a shaft 15. The shaft 15 carries, rotatably and axially movably, limited by a guard ring 16, a cup spring 17 and a coupling member 18. The coupling member 18 is non-rotatably and axially movably connected with the socket 3. The coupling member 18 has an axial claw 19. The hub 2 has in the zone 11 a claw section 20 fitted thereto.

In the housing 1 is fastened, radially within the toroidal coil 8, a second toroidal coil 21. A second insulating ring 22 separates the zone 11 from a magnetically conducting radially inner zone 23 of the hub 2.

An electric current in the toroidal coil 21 produces a magnetic flux 24 in a magnetically conducting zone 25 around the toroidal coil 21 through both zones 11, 23 of the hub 2, through the shaft 15 and the coupling member 18. The magnetic flux 24 at the same time also flows through the claw section 19, 20 of the coupling member 18 and of the hub 2. The coupling member 18 thus simultaneously forms an armature 18 of an electromagnet and an actuation member 18 of a claw clutch 26.

A restoring force of a spring 7, constituted by the outer disks 7 shaped as corrugated disk springs 7, opens and an electric current in a toroidal coil 8 closes, a non-positive friction clutch 14, a disk clutch 14.

A restoring force of a spring 17, constituted by the cup spring 17, opens, and an electric current in a toroidal coil 21 closes a positive claw clutch 26.

Devices for optional actuation and control and regulation of both clutches 14, 26 are not shown, since they are known and common. To them belong speed sensors for the speeds of both connecting members, input members and data memory for optional input and storage of limit values for a relative speed and an actuation cycle, a clock unit, a microprocessor with a differential picture for determining a relative speed from both speeds with a comparator for comparing the relative speed with a limit value and for forming an alarm signal to control an electric current for closing the friction clutch 14 with a time counter for forming an actuation cycle of the claw clutch 26, with a comparator for comparing the actuation time of a limit value and for forming an alarm signal for warning the driver and/or disconnecting an electric current and thus opening the claw clutch 26.

REFERENCE NUMERALS

1: housing
2: hub, disk carrier
3: socket, disk carrier
4: guard ring
5: inner disk, disk
6: end disk, actuation member, armature
7: outer disk, disk, corrugated disk spring, spring
8: toroidal coil
9: insulating ring
10: zone
11: zone
12: magnetic flux
13: zone
14: friction clutch, disk clutch, clutch
15: shaft
16: guard ring
17: cup spring, spring
18: coupling member, actuation member, armature
19: drag section
20: drag section
21: toroidal coil
22: insulating ring
23: zone
24: magnetic flux
25: zone
26: claw clutch, clutch.

We claim:

1. An electromagnetically actuated sliplimiting clutch for the differential gear of a motor vehicle including the following features:
    a first torque-transmitting connecting member of the differential gear non-rotationally supporting inner disks,
    a second connecting member non-rotationally supporting outer disks,
    said inner and outer disks comprising a sliplimiting friction clutch for said differential gear,
    a first toroidal coil fastened to a housing and interacting with a rotatable annular first armature closing said sliplimiting friction clutch,
characterized by
    said first connecting member non-rotationally supported a first claw section (20),
    said second connecting member non-rotationally supporting a second claw section (19),
    said claw sections (19, 20) form a sliplimiting claw clutch (26) for said differential gear,
    a second toroidal coil (21) fastened to the housing and interacting with a rotatable annular second armature (18) closing said sliplimiting claw clutch (26),
    a spring (17) opening said sliplimiting claw clutch (26),
    wherein said first and second toroidal coils are alternatively independently energized to alternatively engage said friction clutch or said claw clutch.

2. A sliplimiting clutch according to claim 1, characterized by the following features:
    said inner disks (5) have flat rubbing surfaces,
    said first armature (6) is an end disk for said inner disks (5),
    said outer disks (7) also have substantially flat rubbing surfaces, but are shaped as corrugated disk springs and open said sliplimiting friction clutch (14), and
    said second armature (18) supports said second claw section (19).

3. A sliplimiting clutch according to claim 1, characterized by the following features:
    a hub (2) is firmly connected with said first connecting member via a shaft (15),
    said hub (2) non-rotationally supports said inner disks (5, 6) and said first claw section (20),
    a disk carrier (3) is firmly connected with said second connecting member,
    said disk carrier (3) non-rotationally suports said outer disks (7) and said second armature (18), and
    said second armature (18) supports said second synchronization section (19).

4. A sliplimiting clutch according to claim 1, characterized by the following features:
    a first insulating ring (9) magnetically separates a magnetically conductive radially outer zone (10) of a hub (2) from a radially central zone (11) of said hub (2) and mechanically connects both zones together,
    a second insulating ring (22) magnetically separates said central zone (11) from a radially inner zone (23) of said hub (2) and mechanically connects both zones together,
    an electric current in said first toroidal coil (8) produces a first magnetic flux (12) for said sliplimiting friction clutch (14),
    an electric current in said second toroidal coil (21) produces a second magnetic flux (24) for said sliplimiting claw clutch (26),
    said central zone (11) of said hub (2) conducts said first magnetic flux (12) and said second magnetic flux (24),
    said central zone (11) of said hub (2) non-rotationally supports said inner disks (5, 6) of said sliplimiting friction clutch (14) and said first claw section (20).

5. A sliplimiting device for a differential gear of a motor vehicle, which comprises:
    a differential gear transmitting power from an input member to first and second output members,
    a friction clutch 14 non-positively connecting the two output members of the differential gear and thus limiting a speed difference between them,
    a claw clutch 26 positively connecting the two output members of the differential gear and thus eliminating speed difference between them,
    a first electromagnet engaging the friction clutch 14,
    a second electromagnet engaging the claw clutch 26,
    wherein said first and second electromagnets are alternatively independently energized to alternatively engage said friction clutch or said claw clutch.

6. The sliplimiting device of claim 5 further including a logic device that controls an electric current in a magnet coil 8 of the first electromagnet, and thus controlling the friction clutch 14 and limiting a speed difference between the two output members of the differential gear.

7. A sliplimiting device of claim 5 further including
a logic device that interrupts electric current in a magnet coil 21 of the second electromagnet after a preset time thereby disengaging the claw clutch 26; and
said logic device prevents electric current in the magnet coil 21 if a speed difference between the two output members of the differential gear exceeds a preset threshold and thus prevents the claw clutch 26 from being engaged.

8. A sliplimiting device of claim 5 which includes the following features:
each of the two electromagnets has a magnet coil 8, 21 in a coil case fixed to said housing 1 of the differential gear;
said housing 1 supports a rotatable shaft 15 and a rotatable shell 3;
said shaft 15 and said shell 3 are each non-rotatably connected to one of three members of the differential gear;
the friction clutch 14 is a multiple disk clutch with inner disks 5 on an inner disk carrier, with outer disks 7 in an outer disk carrier, and with an end disk 6 which forms a first armature of the first electromagnet;
said outer disks 7 are shaped as corrugated disk springs which disengage said friction clutch 14;
an electric current in the magnet coil 8 of the first electromagnet produces a first magnetic flux 12 around the magnet coil 8 through an outer section 13 of the coil case, through an intermediate section 11 of a hub 2, through all disks 5, 6, 7 and through an outer section 10 of the hub 2 back to the outer section 13 of the coil case, and thus the first electromagnet engages the friction clutch 14;
an inner section 23 of said hub 2 is fixed to said shaft 15;
an outer insulating zone 9 magnetically separates and mechanically connects the outer section 10 with said intermediate setion 11 of said hub 2;
an inner insulating zone 22 magnetically separates and mechanically connects the inner section 23 with said intermediate section 11 of said hub 2;
said shell 3 forms the outer disk carrier of the friction clutch 14,
said intermediate section 11 of said hub 2 forms an inner disk carrier of said friction clutch 14 and a first claw section 20 of a claw clutch 26;
an axially movable second armature 18 of the second electromagnet is non-rotatably connected with said shell 3, is rotatably supported on said shaft 15, and forms a second section 19 of said claw clutch 26;
a cup spring 17 axially between said hub 2 and the second armature 18 presses said second armature 18 against a guard ring 16 on said shaft 15, and thus disengages said claw clutch 26; and
an electric current in the magnet coil 21 of the second electromagnet produces a second magnetic flux 24 around the second magnet coil 21 through an inner section 25 of the coil case, through said intermediate section 11 of said hub 2, through the two claws sections 19, 20, through said second armature 18, through said shaft 15 and through said inner section 23 of said hub 2 back to said inner section 25 of the coil case, and
thus the second electromagnet engages said claw clutch 26.

* * * * *